US011078767B2

(12) United States Patent
Tiffany, III et al.

(10) Patent No.: US 11,078,767 B2
(45) Date of Patent: Aug. 3, 2021

(54) APPARATUS AND METHOD FOR POTABLE WATER EXTRACTION FROM SALINE AQUIFERS

(71) Applicants: Henry D. Tiffany, III, Juneau, AK (US); Steven Bryant, Calgary (CA); Gregory A Clark, Victoria (CA); Brian H. de Clare, Victoria (CA); Gary A. Pope, Cedar Park, TX (US)

(72) Inventors: Henry D. Tiffany, III, Juneau, AK (US); Steven Bryant, Calgary (CA); Gregory A Clark, Victoria (CA); Brian H. de Clare, Victoria (CA); Gary A. Pope, Cedar Park, TX (US)

( * ) Notice: Subject to any disclaimer, the term of this patent is extended or adjusted under 35 U.S.C. 154(b) by 442 days.

(21) Appl. No.: 15/849,498

(22) Filed: Dec. 20, 2017

(65) Prior Publication Data

US 2018/0171768 A1 Jun. 21, 2018

Related U.S. Application Data

(60) Provisional application No. 62/437,341, filed on Dec. 21, 2016.

(51) Int. Cl.
| | |
|---|---|
| *E21B 43/18* | (2006.01) |
| *C02F 1/26* | (2006.01) |
| *C02F 9/00* | (2006.01) |
| *E21B 41/00* | (2006.01) |
| *C02F 1/20* | (2006.01) |
| *C02F 101/12* | (2006.01) |
| *C02F 103/36* | (2006.01) |
| *C02F 1/06* | (2006.01) |
| *C02F 101/32* | (2006.01) |
| *C02F 1/16* | (2006.01) |
| *C02F 1/68* | (2006.01) |

(52) U.S. Cl.
CPC .............. *E21B 43/18* (2013.01); *C02F 1/265* (2013.01); *C02F 9/00* (2013.01); *E21B 41/0064* (2013.01); *C02F 1/06* (2013.01); *C02F 1/16* (2013.01); *C02F 1/20* (2013.01); *C02F 1/68* (2013.01); *C02F 2101/12* (2013.01); *C02F 2101/322* (2013.01); *C02F 2103/36* (2013.01); *C02F 2301/066* (2013.01); *C02F 2301/08* (2013.01); *C02F 2303/10* (2013.01); *Y02A 20/00* (2018.01); *Y02A 20/131* (2018.01); *Y02A 20/144* (2018.01); *Y02C 20/40* (2020.08); *Y02W 10/37* (2015.05)

(58) Field of Classification Search
CPC ................................. E21B 43/18; C02F 9/00
USPC ........................................................ 166/370
See application file for complete search history.

(56) References Cited

U.S. PATENT DOCUMENTS

| | | |
|---|---|---|
| 2,357,703 A | 9/1944 | Teichmann |
| 3,258,069 A | 6/1966 | Hottman |
| | (Continued) | |

OTHER PUBLICATIONS

Steven L. Bryant, "The One Stop Carbon Solution", Scientific American, Nov. 2013 p. 74-77.

*Primary Examiner* — Zakiya W Bates
*Assistant Examiner* — Ashish K Varma (57) ABSTRACT

A method and apparatus for desalinating water combined with power generation, wherein a desalination system is used for desalinating aquifer brine water and is operationally related to a power generation system, wherein such dual-purpose co-generation facility captures the natural gas entrained within the aquifer brine water.

12 Claims, 2 Drawing Sheets

(56) References Cited

U.S. PATENT DOCUMENTS

| | | | |
|---|---|---|---|
| 4,116,276 A * | 9/1978 | Cook, Jr. | E21B 43/00 |
| | | | 166/370 |
| 4,189,923 A * | 2/1980 | Berg | F03G 7/04 |
| | | | 60/641.5 |
| 4,261,419 A * | 4/1981 | Probstein | E21B 43/00 |
| | | | 166/265 |
| 4,359,092 A * | 11/1982 | Jones | E21B 43/00 |
| | | | 166/233 |
| 4,824,447 A | 4/1989 | Goldsberry | |
| 5,165,235 A | 11/1992 | Nitschke | |
| 7,299,868 B2 | 11/2007 | Zapadinski | |
| 8,523,487 B2 | 9/2013 | Georgiou et al. | |
| 9,121,259 B2 * | 9/2015 | Bryant | E21B 41/0064 |
| 2006/0032637 A1 | 2/2006 | Ayoub et al. | |

* cited by examiner

APPARATUS AND METHOD FOR POTABLE WATER EXTRACTION FROM SALINE AQUIFERS

CROSS-REFERENCE TO RELATED APPLICATIONS

The present application is related to, claims the earliest available effective filing date(s) from (e.g., claims earliest available priority dates for other than provisional patent applications; claims benefits under 35 USC § 119(e) for provisional patent applications), and incorporates by reference in its entirety all subject matter of the following listed application(s) (the "Related Applications") to the extent such subject matter is not inconsistent herewith; the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith:

U.S. provisional patent application 62/437,341, entitled "POTABLE WATER EXTRACTION FROM SALINE AQUIFERS" filed 21 Dec. 2016.

BACKGROUND

1. Field of Use

The present invention relates generally to a combined methane production, and more particularly to a method for storing CO2 and extracting energy from an aquifer brine to power a desalinization process for desalinating the aquifer brine.

2. Description of Prior Art (Background)

As world population increases, demand for fresh water and power will also increase. Pollutants and drought result in a shortage of fresh water in many locations. Therefore, it would be desirable to provide a process utilizing desalination and distillation combined with power generation whereby demand for fresh water and power can be simultaneously satisfied.

Desalination refers to any of several commercial processes (e.g. distillation/evaporation, reverse osmosis/membrane processes, freezing, geothermal, solar humidification, methane hydrate crystallization, ultrasonic desalination, multi-stage flash (MSF) distillation, and high grade water recycling) that removes salt, minerals and other solids from water in order to obtain fresh water suitable for animal consumption, irrigation, or human consumption. Dual purpose power plants have also been utilized; however, most previous processes of desalination have been stand-alone processes.

A number of factors determine the capital and operating costs for desalination: capacity and type of facility, location, feed water, labor, energy, financing and concentrate disposal. Generally, the cost of removing salt from seawater will be about 3-5 times that of removing salt from brackish water.

In general, distillation is the process of heating a liquid until it boils, capturing and cooling the resultant hot vapors, and collecting the condensed vapors. Evaporation is the boiling of saline water by the addition of heat followed by the condensation of the steam by heat exchange. Evaporators may be classified as boiling or flashing. Desalination stills control pressure, temperature and brine concentrations to optimize the water extraction efficiency. Distillation techniques share the following difficulties: high capital cost, and the consumption of large amounts of energy.

Flash distillation is often employed in the recovery of a solvent from a solution containing a salt or other dissolved material, for example, in desalinization of seawater to produce fresh water. Flash distillation is also employed in the chemical industry and the food industry for the concentration of liquors. In such operations, the solution being treated is commonly referred to as the brine. Multistage flash distillation heats the brine to a desired temperature in its liquid state and then effects the evaporation of the heated solution in a series of stages which are maintained at progressively decreasing pressures. The condensation of the vapor created at each stage is carried out to produce the substantially pure solvent which is withdrawn. The heat which is absorbed during condensation is often employed for the preheating of the brine prior to its expansion.

It is generally known to employ parallel trains of multistage flash evaporation units, particularly in the desalination of seawater. Such installations are able to carry out desalinization in a manner which is economically competitive with other available alternative methods of desalinization.

Reverse osmosis is a technology wherein fresh water is extracted from saline water by pressure. This is accomplished by circulating saline water under high pressure (i.e., 1000-2000 psig) around a loop. One portion of the loop is adjacent to a membrane. The membrane selectively allows water to pass through it, while preventing the passage of most ions. Effectively, fresh water is squeezed from the saline water. Excellent energy efficiency can be achieved by this method. However, reverse osmosis techniques share the following difficulties: the membranes are prone to plugging and in practice the fresh water produced is not completely free of dissolved salts.

Geothermal is a technology wherein hot water or steam is collected from hydrothermal reservoirs and transferred through a heat exchanger to a closed loop desalination system, and returned to the geothermal reservoir. The hot water in the closed loop desalination system is flashed in a flash zone to form steam and the steam is used a source of heat for desalination.

Solar humidification is a technology that imitates a part of the natural hydrologic cycle in that the saline water is heated by the sun's solar radiation so that the production of water vapor (humidification) increases. The water vapor is then condensed on a cool surface, and the condensate collected as product water.

Accordingly, various attempts to resolve the foregoing disadvantages have been proposed. Most notably, dual purpose desalination/power plants, which are currently in use, produce fresh water by using the exhaust heat from a gas turbine as a source of heat for desalination or by using excess steam from a steam generating system used in a steam expansion turbine during low electric power demands and off peak hours as a source of heat for desalination. Power generation using steam expansion is a common process. Conventional methods for power generation include the steam cycle, cogeneration cycle, and the combined cycle.

In the steam cycle, water is heated to produce steam at high temperature and pressure. The steam is typically superheated and expanded across a turbine to produce power. The steam will frequently be heated again and expanded across a turbine a second time. The steam will then be condensed at a low temperature and the cycle is repeated. In a dual purpose desalination/power plant the power plant's condenser is replaced by the desalination plant's heat exchanger enabling such captured heat energy to reduce the energy requirements of the desalination plant. Additional energy efficiency is improved by recovery of additional waste heat from the stack exhaust.

Additional efficiencies in energy cost and capital costs are desirable for such dual purpose desalination/power plants for obtaining potable water substantially free of trace salts, minerals, and dissolved solids in order to obtain fresh water suitable for animal consumption, irrigation, or human consumption.

Therefore, it is readily apparent that there would be a recognizable benefit from a method and apparatus for desalinating water combined with power generation utilizing the efficiencies of a dual purpose co-generation facility having reduced capital cost and reduced consumption of energy, and wherein such method and apparatus desalinates aquifer brine water entrained with methane and other natural gases.

BRIEF SUMMARY

The invention described herein discloses a method for storing carbon dioxide and other greenhouse gases and producing methane, geothermal energy (heat) or both from deep saline aquifers and in particular from geopressured-geothermal geological formations containing brine with methane dissolved in the brine, to power at least one desalination system.

One embodiment of the present invention discloses a process for producing methane from an aquifer, a reservoir, or combinations thereof comprising the steps of: collecting a native brine obtained by flowing or pumping to the surface from a first well or a set of wells made by drilling, digging, driving, boring, or combinations thereof, at a first location in the aquifer or the reservoir and extracting methane from a gas phase comprising methane in the native brine, wherein the extraction is done by contacting the native brine with carbon dioxide ($CO_2$) under pressure or by reducing pressure at a surface of the native brine, wherein the $CO_2$ displaces the gas phase comprising methane from the native brine. In some cases, free methane gas may exist or form in the aquifer (e.g., due to pressure drawdown near the production wells or by expulsion when mixed with the $CO_2$), so some methane gas will be produced at the surface in such cases without either of the operations of "contacting with $CO_2$ under pressure" or "reducing pressure at a surface". The $CO_2$ used in the extraction is in a pure form or is a mixture of flue gases. The process described hereinabove further comprises the step of using the methane to power a desalination system.

In one aspect of the present invention the process further comprises the step of storing the carbon dioxide by injection of $CO_2$ dissolved in brine after separation of the methane or injection of both supercritical $CO_2$ and $CO_2$ dissolved in brine as a two-phase mixture into a second location in the aquifer or reservoir by the use of a second well or a set of wells, wherein the second well or set of wells is created by drilling, digging, driving, boring, or combinations thereof. In another aspect the aquifer is a non-geopressured-geothermal aquifer. In another aspect the aquifer is a geopressured-geothermal aquifer.

In yet another aspect the mixture of gases comprises a flue gas from an industrial emitter, a gas from a coal-fired electric power plant, a gas from a petrochemical plant or refinery or gases from any commercial, industrial or household operations. In another aspect the pure $CO_2$ or the mixture of gases is contacted with the brine at pressures of about 100 psi to 1,000 psi or greater to dissolve it into the brine before injection of the brine into the aquifer, reservoir, or combinations thereof. In another aspect the pure $CO_2$ or the mixture of gases is contacted with the brine at pressures of 100 psi, 200 psi, 300 psi, 400 psi, 500 psi, 700 psi, 900 psi, 1,000 psi, 2,500 psi, 5,000 psi, and 10,000 psi. One aspect of the process described hereinabove further comprises the step of producing of geothermal energy from the brine by the extraction of energy from the native brine by heat exchange or any other suitable method.

Another embodiment of the present invention relates to a process for producing geothermal energy from an aquifer, a reservoir, or combinations thereof comprising the steps of: (i) collecting a native brine obtained by flowing or pumping to the surface from a first well or a set of wells made by drilling, digging, driving, boring, or combinations thereof, at a first location in the aquifer or the reservoir and extracting energy from the native brine by heat exchange, wherein the extraction results in a reduction of the temperature of the native brine. The process for producing geothermal energy further comprises the steps of: contacting carbon dioxide ($CO_2$) under pressure with the native brine after extraction of the geothermal energy, wherein the $CO_2$ is in a liquid, a supercritical fluid or is a two-phase mixture, wherein the $CO_2$ is in a pure form or is a mixture of gases and injecting the native brine after extraction of geothermal energy into a second location in the aquifer or reservoir by the use of a second well or set of wells to store the $CO_2$, wherein the second well or set of wells is created by drilling, digging, driving, boring, or combinations thereof. In one aspect the aquifer is a non-geopressured-geothermal aquifer. In another aspect of the process the aquifer is a geopressured-geothermal aquifer. In yet another aspect the mixture of gases comprises a flue gas from an industrial emitter, a gas from a coal-fired electric power plant, a gas from a petrochemical plant or refinery or gases from any commercial, industrial or household operations.

In one aspect the pure $CO_2$ or the mixture of gases is contacted with the brine at pressures of about 100 psi to 1,000 psi or greater to dissolve it into the brine before injection of the brine into the aquifer, reservoir, or combinations thereof. In another aspect the pure $CO_2$ or the mixture of gases is contacted with the brine at pressures of 100 psi, 200 psi, 300 psi, 400 psi, 500 psi, 700 psi, 900 psi, 1,000 psi, 2,500 psi, 5,000 psi, and 10,000 psi. Yet another aspect of the process describes a step of producing methane from the brine by contacting carbon dioxide ($CO_2$) under pressure with the native brine or by reducing pressure at a surface of the native brine, wherein the $CO_2$ displaces a gas phase comprising methane from the native brine. The methane generated by the process described hereinabove is used to generate power to drive a desalination system.

In yet another embodiment the present invention describes a process for producing methane and geothermal energy from an aquifer, a geopressured formation, a reservoir, or combinations thereof comprising the steps of: (i) pumping and collecting a native brine from a first location in the aquifer or the geopressured formation to a surface by the use of a first water well, wherein the first water well is created by digging, drilling, driving, boring, or combinations thereof, (ii) extracting methane from a gas phase comprising methane in the native brine, wherein the extraction is done by contacting the native brine with carbon dioxide ($CO_2$) under pressure or by reducing pressure at a surface of the native brine, wherein the $CO_2$ displaces the gas phase comprising methane from the native brine, and (iii) generating energy from the separated methane by a conversion of the methane to power a desalination system.

In one aspect the process further comprises injecting the brine after separation of the gas phase into a second location in aquifer or the geopressured formation by the use of a second water well, wherein the second water well is created by digging, drilling, driving, boring, or combinations thereof. In another aspect the $CO_2$ is in a pure form or is a mixture of gases.

One embodiment of the present invention is related to a method for carbon capture and sequestration (CCS) in a deep saline aquifer, producing methane or both comprising the steps of: (i) providing carbon in the form of carbon dioxide ($CO_2$) or other greenhouse gases from an industrial emitter, a coal-fired electric plant, a petrochemical plant or refinery, a flue gas or any commercial, industrial or household operation, (ii) pumping and collecting a native brine from a first location in the aquifer to a surface by the use of a first water well, wherein the first water well is created by digging, drilling, driving, boring, or combinations thereof, (iii) contacting the $CO_2$ under pressure with the native brine, wherein the $CO_2$ displaces a gas phase comprising methane from the native brine, (iv) separating the gas phase comprising methane from the brine, (v) injecting the brine after separation of the gas phase into a second location in aquifer to capture and sequester the $CO_2$ in the brine by the use of a second well, wherein the second water well is created by digging, drilling, driving, boring, or combinations thereof, and (vi) generating electricity with the separated methane.

Another embodiment of the instant invention describes a closed-loop system for carbon capture and sequestration (CCS) in a geothermal aquifer, producing methane and geothermal energy or both comprising: a pumping system for pumping a native brine from a first location in the aquifer to a surface by the use of a first water well, wherein the first water well is created by digging, drilling, driving, boring, or combinations thereof, a container, a tank, a well, a reservoir, and combinations and modifications thereof for collecting the native brine at the surface, providing carbon in the form of carbon dioxide ($CO_2$) or other greenhouse gases from an industrial emitter, a coal-fired electric plant, a petrochemical plant or refinery, a flue gas or any commercial, industrial or household operation, extracting methane from a gas phase comprising methane in the native brine, wherein the extraction is done by contacting the native brine with carbon dioxide ($CO_2$) under pressure or by reducing pressure at a surface of the native brine wherein, the $CO_2$ displaces the gas phase comprising methane from the native brine, a system for separating the gas phase comprising methane from the brine, an injection system for injecting the brine after separation of the gas phase into a second location in aquifer to sequester the $CO_2$ in the brine by the use of a second well, wherein the second water well is created by digging, drilling, driving, boring, or combinations thereof, and an energy generating system for converting the separated methane to power a desalination system.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

The following brief definition of terms shall apply throughout the application:

The term "comprising" means including but not limited to, and should be interpreted in the manner it is typically used in the patent context;

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value or the variation that exists among the study subjects;

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps;

The term "or combinations thereof" as used herein refers to all permutations and combinations of the listed items preceding the term. For example, "A, B, C or combinations thereof" is intended to include at least one of: A, B, C, AB, AC, BC or ABC, and if order is important in a particular context, also BA, CA, CB, CBA, BCA, ACB, BAC or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example; and If the specification states a component or feature "may," "can," "could," "should," "preferably," "possibly," "typically," "optionally," "for example," or "might" (or other such language) be included or have a characteristic, that particular component or feature is not required to be included or to have the characteristic.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The term "aquifer" as used herein relates to a water-bearing bed or stratum of permeable rock, sand or gravel capable of yielding considerable quantities of water to wells or springs. As used herein, the term "geothermal aquifer" refers to a porous zone in the earth's crust which contains water which is at least about 60° C. As used herein the term "geopressured aquifer" refers to a porous zone in the earth's crust, which contains water at a pressure exceeding the pressure corresponding to the normal hydrostatic value of about 0.45 psi/ft.

The term "brine" as used herein in various embodiments is used in a broad sense to denote the entire range of concentrations of aqueous solutions of water soluble inorganic compounds, for example, natural saline water containing sodium chloride, including brackish water, sea water, and saturated or nearly saturated brines, such as the brine in the Great Salt Lake or brines obtained from wells. In addition to sodium chloride-containing solutions, other brines to which the process may be applied include aqueous solutions of dissolved mineral salts, for examples, halides, carbonates and sulfates of sodium, potassium, lithium, calcium, magnesium, zinc and copper.

The term "geothermal" as used in the specification and claims refers to those unusual occurrences of nature when hot fluids such as water and gas occur in pockets beneath the earth and have been tapped for their heat content.

The term "flue gas" or "effluent" as used herein includes the exhaust gas from any sort of combustion process (including coal, oil, natural gas, etc.).

The term "methane" as used herein includes natural gas comprising the elements carbon and hydrogen.

The term "petrochemical plant or refinery" as used herein refers to an industrial processing plant where crude oil is processed and refined into commercially valuable petroleum products, such as gasoline, diesel fuel, liquefied petroleum game, etc.

The term "supercritical fluid" as used in the specification and claims refers to the state of matter of a material above its critical point, i.e., a critical temperature, Te, and critical pressure, Pe, at which two phases of a substance, in equilibrium with each other, become identical, forming one phase. The term "supercritical CO2" as used herein refers to CO2 that exhibits a pressure and temperature equal to or above its critical pressure and critical temperature (73.8 bar, 31.1° C.).

The term "wellbore" as used in the present application is defined as a bore hole extending from the earth surface to a target hydrocarbon-bearing formation. Thus, a wellbore is a conduit providing fluid communication between the surface and the target formation. The term "well" as used herein is synonymous with the term "wellbore". The term "boring" is intended to encompass any method of forming a passage in an earth formation extending laterally or radially from a wellbore. The term "drilling", likewise, will be taken to include exploration for and extraction of materials from the earth as well as formation of a deep hole through which the materials are extracted.

The term "psi" as used throughout the specification and claims is defined as pounds per square inch gauge pressure.

The term "gas turbine" as used herein refers to any turbine system having a compression section, combustion section, and turbine section.

The term "compressed natural gas (CNG)" as used herein refers to a fossil fuel substitute for gasoline (petrol), diesel, or propane/LPG.

A "greenhouse gas" of the present invention may include any gas which is known to contribute to the greenhouse effect. The term "greenhouse effect" herein is intended to encompass the environmental effects of global warming and/or acid rain. The "greenhouse gas" may comprise methane (CH4), or any carbon oxide (COx) or nitrogen oxide (NOx) gas. A carbon oxide of the present invention may comprise carbon monoxide (CO) or carbon dioxide (CO2). The "greenhouse gas" may further comprise any carbon-halogen or sulfur-halogen containing gas. A carbon-halogen containing gas may comprise methyl bromide (CH3Br) or carbon tetrachloride (CCl4). A carbon-halogen containing gas may further comprise a gas selected from hydrofluorocarbons (HFCs), chlorofluorocarbons (CFCs), and/or perfluorocarbons (PFCs).

The term "carbon sequestration" as used in the present application generally refers to the long-term storage of carbon in a multitude of ways, including, but not limited to, terrestrial, underground, or ocean environments to reduce the buildup of carbon dioxide in the atmosphere.

For clarity, it will be understood by those skilled in the art that in the figures not all input or output ports are specifically labeled. For example, it will be understood that pressure reducer 105 shown in FIG. 1 requires an inlet port for inputting pressurized brine 104, a gas outlet port for outputting methane gas 109B and an outlet port for outputting depressurized brine 106. Likewise, for the heat exchanger 103, the desalination processor 110D, and the rare element extractor 111R.

The invention involves producing by extraction or production wells brine from an aquifer, e.g., a geopressured-geothermal aquifer, containing methane dissolved in the brine, and/or producing methane gas that has been exsolved from the brine by contact with injected CO2 by the use of extraction or production wells. Brine with methane dissolved in it and/or methane gas is extracted from one or more production wells at the same time that carbon dioxide (CO2) is dissolved into the produced brine and injected in one or more injection wells. The invention further involves extracting geothermal power from the brine. The invention further involves using the geothermal energy and the extracted methane to power one or more desalination systems.

An important application of the present invention is associated with the capture of carbon dioxide from a large industrial emitter such as a coal-fired electricity-generating power plant or a petrochemical plant or a refinery among many other possible sources of carbon dioxide or gases containing carbon dioxide. The cost of capturing and storing that CO2, which is a key technology for mitigating greenhouse gas emissions, can be offset significantly by the revenue from selling the methane and/or geothermal energy of the hot brine from sufficiently deep, hot formations. Moreover, the simultaneous extraction and injection of brine through two sets of wells can be done in such a way that very little pressure buildup occurs in the formation whereas when fluids are injected without any production, as in the conventional way of storing CO2 in deep, saline aquifers, the storage will often be severely limited by the pressure buildup in the aquifer. Still another method of accomplishing this purpose would be to inject both brine and gases containing carbon dioxide or other greenhouse gases while producing brine from other wells in the same aquifer.

The cost of capturing and storing anthropogenic CO2 is large. The method of the present invention will reduce that cost and greatly increase the acceptance and feasibility for mitigating "greenhouse" gas emissions. In addition, the present invention possesses number of advantages over existing technologies: current technologies for injecting CO2 in saline aquifers do not anticipate extraction from those aquifers. Consequently, the pressure buildup will restrict the injection rate since the pressure must be kept below a certain maximum value to avoid unacceptable risks associated such as fracturing of the aquifer's seal. It has been proposed to extract brine to relieve this problem, but this leads to the issue of disposing the extracted brine. The advantages of the present invention are that (i) it closes the loop (the extracted brine is reinjected into the same formation) while deriving energy from methane and thermal energy removed from the brine, (ii) injecting CO2 dissolved in brine into these deep geopressured formations does not require large injection pressures, whereas injecting bulk phase CO2-which would also sequester CO2 and drive methane (CH4) out of solution-would require very large injection pressures in the surface equipment. This is expensive and imposes greater safety concerns. The present invention requires significantly smaller injection pressures, because the greater density of brine compared to the CO2 gives a much larger bottom-hole pressure in these deep formations, and (iii) the brine in these formations is hot and could be used as a source of geothermal energy.

The conventional vehicle for carbon (CO2) capture and pressurization from flue gas requires upwards of 30% of a power plant's energy, making the cost of retrofitting the existing plants for carbon capture prohibitive. This energy penalty cannot be significantly reduced because of the thermodynamic limit for conventional capture methods and pressurization requirements. In addition, fundamental problems with current geological carbon sequestration methods (GCS) include, but are not limited to, the need to pressurize sufficiently to overcome aquifer pressure for injection, the increase in aquifer pressure resulting from limited CO2 injectivity and from limited brine diffusivity in the aquifer, and the risk of leakage of the buoyant CO2 phase after injection. Beyond these technical problems is the economic challenge: CCS in aquifers is "pure cost" with no offsetting benefit [in the absence of a cost for CO2 emission (e.g., cap and trade or carbon tax)].

The present invention takes advantage of both dissolved methane and geothermal energy from saline aquifers. Several very important differences from conventional CCS are notable. First, instead of injecting CO2 directly into the aquifer, native brine is pumped from the aquifer to the surface, and CO2 captured from the flue gas is injected under modest pressure (~1,000 psi) into the saline solution. Pressurization is required to return the saline water with dissolved CO2 into the aquifer (through a different well), but injection is aided by the density of the CO2-saturated brine. Per unit volume of fluid this is less costly energetically than pumping the same amount of CO2 directly into a geopressured aquifer. Larger volumes of brine are needed, however, so that the total pumping costs are comparable to conventional CCS. Secondly, when CO2 contacts water containing dissolved methane, almost all of the dissolved methane is expelled from solution and forms a gas phase since methane is supercritical at the temperature of interest. The production of methane during the injection of supercritical CO2 into an aquifer has already been observed in the field. Thus, methane can be extracted and used to produce energy. Thirdly, the saline water comes to the surface at about 300° F. and thus contains significant amounts of thermal energy that can be used in various ways. Fourthly, the CO2-saturated brine is denser than the native brine, which eliminates buoyant leakage and thus provides a much more robust permanence for CO2 storage.

Formations of abnormally high pressure and temperature lie along the Gulf Coast of the United States at depths exceeding 10,000 feet. The water is often saturated or nearly saturated with dissolved methane. During the 1970s, the U.S. Department of Energy funded several studies related to the development of these geopressured-geothermal reservoirs as an energy resource, both from the standpoint of heat recovery and as a source of natural gas. Several "wells of opportunity" were tested on a short-term basis, primarily to assess the amount and quality of the natural gas associated with geopressured-geothermal waters. Table 1 from is a summary of some of the results from test wells showing substantial production of methane. For example, the Pleasant Bayou No. 2 well produced 330 million SCF of natural gas from 1979 to 1983.

The methane content of these brines is on the order of 35 SCF per barrel of brine. Because these aquifers are regionally extensive, the total amount of methane is enormous with estimates ranging from 3,000 to 46,000 Te F. In addition to the well characterized geopressured-geothermal aquifers along the Gulf Coast of Texas and Louisiana, there are likely to be other large sources of methane dissolved in normally pressured saline aquifers in the U.S.; located in most geological basins where oil and gas are produced including but not limited to, the mid west, mid continent and west coast.

The energy content of the hot brine is also very significant. The temperature of Gulf Coast geothermal aquifers is about 300° F., and the energy that can be extracted from produced brine is of the same order of magnitude as the energy from the produced methane. For example, the change in enthalpy when the temperature of one barrel (42 gallons) of hot water is reduced from 300° F. to 100° F. is 70,000 Btu, which is about twice the energy content of the dissolved methane.

The manner of injecting CO2 is a crucial component of this approach. The conventional and most straightforward way to sequester CO2 is to inject it directly into the aquifer as a supercritical fluid. When the CO2 mixes with the methane-saturated brine in the aquifer, the methane will come out of solution and flow upward where it can be captured and produced from a production well at a higher elevation in the aquifer. However, injecting only CO2 requires another aquifer or separate costly injection wells in the same aquifer to receive the extracted brine. Moreover, it is preferable to inject brine containing dissolved CO2 rather than just CO2. In this case, injected brine displaces the native brine bearing dissolved methane toward the production wells in the aquifer. The displacement of one brine by another brine is a much more efficient process than the displacement of a less viscous and less dense fluid such as supercritical CO2, in the sense that one volume of injected brine displaces nearly one volume of native brine, while one volume of injected supercritical CO2 may displace only a small fraction of native brine due to well-known mechanisms for preferential flow (gravity override by the less dense CO2 and fingering of the less viscous CO2 phase through the brine phase). The brine-displacement-by-brine process thus results in a much higher recovery of the methane and thermal energy (heat) than injecting supercritical CO2 and has other significant advantages, notably the ability to control the aquifer backpressure that limits injection rates in conventional CCS.

Figure 1:
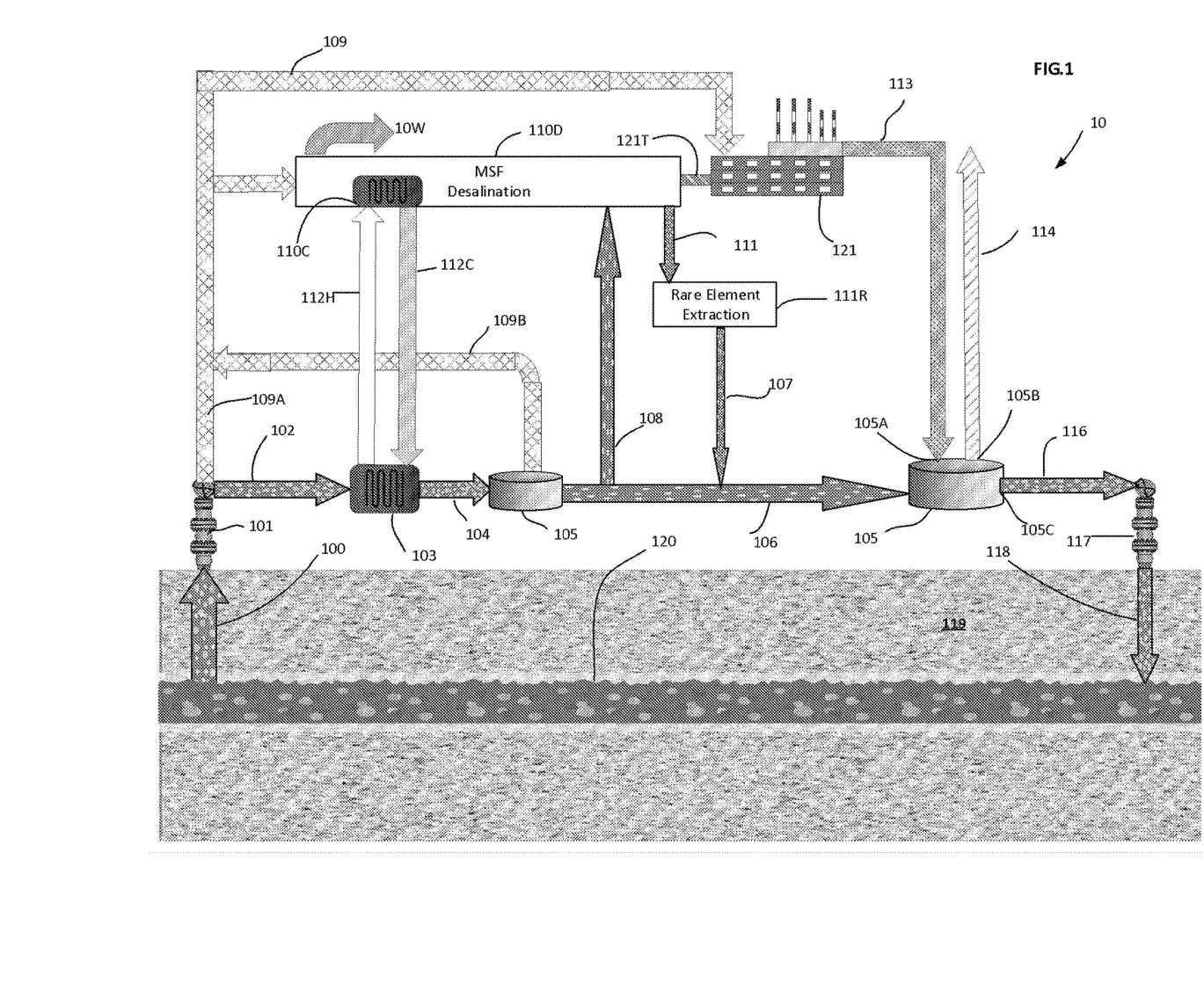
FIG. 1 is an illustrative diagram of a desalination system in accordance with the present invention.

Referring now to FIG. 1 there is shown an illustrative diagram of a desalination system in accordance with the present invention. The hot brine, approximately 300 degrees Fahrenheit, 100 flows from the aquifer 120 (a permeable aquifer containing methane saturated brine solution) through wellhead 101. A first reduction in pressure at wellhead 101 brings a portion of methane 109A out of the methane saturated hot brine 100. A flow of hot brine is discharged from the wellhead 102 and flows into heat exchanger 103.

Heat exchanger 103 may be any suitable type of heat exchanger for exchanging heat from one fluid medium to another. For example, the greatest heat exchange is achieved by providing the maximum possible area of material across which the desired heat exchange may take place. Various devices have been employed so to increase the material area, such as, for example, fins or corrugations across which pass the media between which the heat exchange is to take place. The use of heat exchangers of a tubular configuration may also be advantageous wherein it is desired that the heat exchange take place wholly within the exchanger. The tubular heat exchangers commonly in use in such an environment are of the type known in the art as "shell and tube," wherein a plurality of tubular elements conveying one heat exchange medium are arranged within a shell through which is circulating another heat exchange medium with or without the use of baffles to direct the flow, which is substantially axial along the tubes.

Still referring to FIG. 1, cooler brine 104 exiting heat exchanger 103 flows to pressure reducer 105 where more methane 109 is extracted from the cooler brine 104. Now cooler brine 106 flows to high pressure mixer 115 via port 115C where effluent gas 113 from factory 121 is inputted to mixer 115 via inlet port 115A and is mixed with cooler brine 106 under high pressure. The effluent gas 113 comprising CO2 displaces the methane 114 remaining in cooler brine 106 and reject stream 107, thereby extracting methane 114. It will be understood that methane 114 may be combined with methane 109 or used for other applications. It will also be understood that reject stream 107 may be combined with brine 106 before mixer 115 or within mixer 115.

High pressure mixer 115 outputs via port 115C brine saturated with dissolved CO2 and under high pressure to injector pump 117 which injects the pressurized brine with dissolved CO2 118 back into aquifer 120. The injected brine 118 pushes the native brine comprising dissolved methane through the aquifer 120 towards wellhead 101.

Still referring to FIG. 1 there is shown multi-stage flash MSF distillation system 110D. MSF distillation system 110D may be any suitable MSF distillation system to produce potable water 10W. For example, MSF distillation system 110D system may consists essentially of: a flash evaporator composed of a heat recovery section having several stage flash chambers and a heat rejection section having at least two stage flash chambers; a deaerator, thickener, seed mixing tank, brine recycling pump, brine extracting pump, brine heater, and the like. (Components not shown.)

In a typical multi-stage flash distillation process, feed liquid to be distilled 108 is progressively preheated by passage along a primary flow path in heat exchange relation with vapor zones of a series of successively staged flash evaporation chambers having flash liquid zones arranged in fluid communication. Flash liquid evaporated from the various flash liquid zones is replenished by feed liquid diverted from the primary flow path to and along secondary or by-pass flow paths leading directly to associated liquid zones. The liquid diverted to each secondary flow path has a temperature substantially equal to the temperature of the flash liquid in the zone to which it is diverted. Feed liquid is tapped from the various parts to provide a plurality of streams of feed liquid which collectively comprise the primary flow path. It will be appreciated that feed liquid 108 is still naturally geopressured thus reducing the number and/or power of pumps required to pump feed liquid 108 through distillation system 110D.

It will be appreciated that energy derived from methane 109 and/or methane 114 and/or thermal heat derived from hot brine 102 via heat exchanger 103 and transport fluid 112H may be used to power MSF distillation system 110D. Similarly, thermal power may also be derived via thermal coupler 121T from factory 121.

Still referring to FIG. 1 there is shown reject stream 111 flowing to rare element extractor 111R Reject stream 111 may contain so called rare earth elements or rare earth metals (e.g., cerium (Ce), dysprosium (Dy), erbium (Er), europium (Eu), gadolinium (Gd), holmium (Ho), lanthanum (La), lutetium (Lu) neodymium (Nd), praseodymium (Pr), promethium (Pm), samarium (Sm), scandium (Sc), terbium (Tb), thulium (Tm), ytterbium (Yb) and yttrium (Y).) or other desirable elements (e.g. lithium, gold, silver, etc.). Rare element extractor 111R may extract desired elements by any suitable process, such as, for example, precipitation or filtration. Also, shown in FIG. 1 is stream 107 from rare element extractor 111R mixing with cold water brine 106.

It will be appreciated the system 10 is a closed loop system maintaining a nearly steady state liquid volume within aquifer 120. It will be further appreciated that the volume of potable water 10W compared with the volume of brine in aquifer 120 is negligible with respect to maintaining geothermal and geopressure conditions within the aquifer.

Still referring to FIG. 1, there is shown aquifer pressure control system 300, fluid reservoir 302, fluid flow 304A, fluid flow 304B, valve 306, aquifer pressure monitors 308, and pressure monitor 309. Aquifer pressure control system 300 monitors aquifer 120 geopressure via pressure monitors 308, 309 and algorithmically determines necessary geopressure required to maintain aquifer stability based upon pressure monitor data supplied via data line 310 and production of potable water 10W. It will be appreciated that aquifer pressure monitors may be any suitable pressure monitors and may be connected to aquifer pressure control 300 by any suitable means, such as for example, physical wire, Bluetooth, or other radio transmission. If necessary, aquifer pressure control 300 introduces fluid 304A from storage reservoir 302 via valve 306 into closed system 10 to maintain pressure stability with the aquifer 120. Fluid reservoir may be any suitable fluid reservoir, such as, for example, tanks, lakes, and/or salt-ponds. Fluids 304A, 304B may be any suitable fluid such as seawater or other non-potable fluid.

Figure 2:
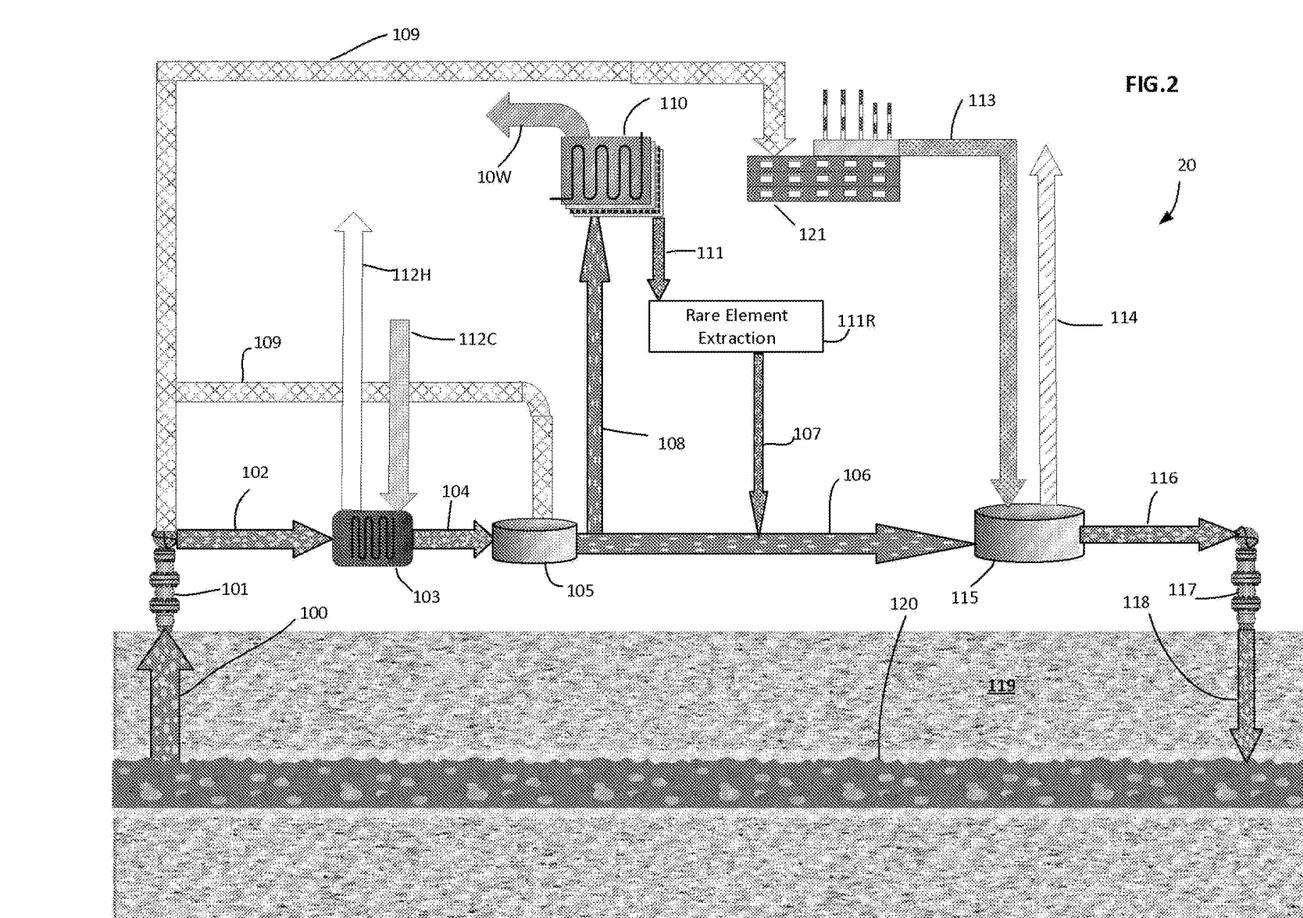
FIG. 2 is an alternate embodiment of a desalination system in accordance the present invention shown in FIG. 1.

Referring also to FIG. 2, an alternate embodiment of a desalination system in accordance the present invention shown in FIG. 1. In this embodiment distillation system 110 may be any suitable distillation system such as an ultrasonic or reverse osmosis (RO) distillation system. It will be further appreciated that the RO distillation system does not require the power as required by the MSF distillation system shown in FIG. 1. Consequently, power derived from methane 104, 114, and thermal energy from heat exchanger 103 may be used for other applications, such as, for example, powering factory 121.

It should be understood that the foregoing description is only illustrative of the invention. Thus, various alternatives and modifications can be devised by those skilled in the art without departing from the invention. Accordingly, the present invention is intended to embrace all such alternatives, modifications and variances that fall within the scope of the appended claims.

What is claimed is:

1. A method for extracting potable water from pressurized methane saturated brine, the method comprising:
    flowing to a ground surface the pressurized methane saturated brine;
    depressurizing at the ground surface the pressurized methane saturated brine to a first pressurized methane brine;
    collecting a first portion of methane gas outgassed from the first pressurized methane brine;
    extracting thermal energy from the first pressurized methane brine;
    depressurizing the first pressurized methane brine to a second pressurized methane brine; and
    collecting a second portion of methane gas outgassed from the second pressurized methane brine.

2. The method as in claim 1 further comprising:
    providing a distillation processor;
    desalinizing the second pressurized methane brine with the distillation processor, wherein desalinizing the second pressurized methane brine comprises powering the distillation process with energy derived from at least one of the first or second portions of methane gas or the extracted thermal energy.

3. The method as in claim 2 wherein providing the distillation processor further comprises providing a multi-stage flash processor.

4. The method as in claim 2 wherein desalinizing the desalinizing the second pressurized methane brine comprises:
    generating potable water; and
    generating a reject stream.

5. The method as in claim 4 further comprising extracting rare earth elements from the reject stream.

6. The method as in claim 4 further comprising mixing the reject stream with the second pressurized methane brine.

7. The method as in claim 6 further comprising:
    mixing the second pressurized methane brine mixed with the reject stream with CO2 gas to produce a pressurized CO2 brine mix; and
    collecting a third portion of methane gas outgassed from the second pressurized methane brine mixed with the reject stream and mixed with the CO2 gas.

8. The method as in claim 7 further comprising injecting the pressurized CO2 brine mix into an aquifer.

9. A closed loop method for extracting potable water and methane gas from geopressured methane saturated brine in a geopressured aquifer, the method comprising:
    flowing to a ground surface the pressurized methane saturated brine;
    depressurizing at the ground surface the pressurized methane saturated brine to a first pressurized methane brine;
    collecting a first portion of methane gas outgassed from the first pressurized methane brine;
    extracting thermal energy from the first pressurized methane brine;
    depressurizing the first pressurized methane brine to a second pressurized methane brine;
    collecting a second portion of methane gas outgassed from the second pressurized methane brine;
    desalinizing the second pressurized methane brine, wherein desalinizing the second pressurized methane brine comprises powering the distillation process with energy derived from at least one of the first and second portions of methane gas and the extracted thermal energy, wherein desalinizing the second pressurized methane brine comprises:
    generating potable water; and
    generating a reject stream.

10. The closed loop method as in claim 9 further comprising extracting rare earth elements from the reject stream.

11. The closed loop method as in claim 9 further comprising:
    mixing the reject stream with the second pressurized methane brine
    mixing the second pressurized methane brine mixed with the reject stream with CO2 gas to produce a pressurized CO2 brine mix; and
    collecting a third portion of methane gas outgassed from the second pressurized methane brine mixed with the reject stream and mixed with the CO2 gas.

12. The closed loop method as in claim 11 further comprising injecting the pressurized CO2 brine mix into the geopressured aquifer.

* * * * *